United States Patent
Hyogo et al.

(10) Patent No.: US 8,945,721 B2
(45) Date of Patent: Feb. 3, 2015

(54) ALUMINUM ALLOY HEAT EXCHANGER

(75) Inventors: Yasunori Hyogo, Izu (JP); Michihide Yoshino, Susono (JP)

(73) Assignee: Mitsubishi Aluminum Co., Ltd., Tokyo (JP)

(*) Notice: Subject to any disclaimer, the term of this patent is extended or adjusted under 35 U.S.C. 154(b) by 209 days.

(21) Appl. No.: 13/582,211

(22) PCT Filed: Feb. 25, 2011

(86) PCT No.: PCT/JP2011/054319
§ 371 (c)(1),
(2), (4) Date: Aug. 31, 2012

(87) PCT Pub. No.: WO2011/108460
PCT Pub. Date: Sep. 9, 2011

(65) Prior Publication Data
US 2012/0318488 A1  Dec. 20, 2012

(30) Foreign Application Priority Data

Mar. 2, 2010  (JP) ................. 2010-045734

(51) Int. Cl.
*B32B 15/04* (2006.01)
*B32B 15/20* (2006.01)
(Continued)

(52) U.S. Cl.
CPC ............ *F28F 21/089* (2013.01); *B23K 1/0012* (2013.01); *B23K 35/22* (2013.01);
(Continued)

(58) Field of Classification Search
CPC .... B32B 15/04; B32B 15/017; B32B 15/016; B32B 15/043; B32B 15/20; B32B 2597/00; C22C 21/00; C22C 21/02; C22C 21/04

USPC .......................... 428/650, 654, 658
See application file for complete search history.

(56) References Cited

U.S. PATENT DOCUMENTS 3,878,871 A   4/1975   Anthony et al.
4,911,351 A   3/1990   Ishikawa et al.
(Continued)

FOREIGN PATENT DOCUMENTS

CN   1199163   11/1998
CN   1401011    3/2003
(Continued)

OTHER PUBLICATIONS

Machine Translation, Hiyougo Yasunori et al., JP 2009-106947, May 2009.*
(Continued)

*Primary Examiner* — Michael E La Villa
(74) *Attorney, Agent, or Firm* — Oblon, Spivak, McClelland, Maier & Neustadt, L.L.P.

(57) ABSTRACT

An aluminum alloy heat exchanger with aluminum alloy tubes is provided by assembling and brazing. A coating which includes from 1 to 5 g/m$^2$ of Si powder, from 3 to 20 g/m$^2$ of Zn containing flux, and from 0.2 to 8.3 g/m$^2$ of binder is formed on the aluminum alloy tubes. The fins contain Zn and 0.8 to 2.0% by mass of Mn, Si in a ratio of 1/2.5 to 1/3.5 relative to the Mn, and less than 0.30% by mass of Fe. A fillet is formed between the tube and the aluminum alloy fin after brazing, and a primary crystal portion is formed in the fillet. A eutectic crystal portion is formed in a portion other than the primary crystal portion, and the electric potential of the primary crystal portion is equal to or higher than the electric potential of the aluminum alloy fin.

4 Claims, 5 Drawing Sheets

(51) Int. Cl.

| | | |
|---|---|---|
| *F28F 1/30* | (2006.01) | |
| *F28F 21/08* | (2006.01) | |
| *B23K 1/00* | (2006.01) | |
| *B23K 35/22* | (2006.01) | |
| *B23K 35/362* | (2006.01) | |
| *B23K 35/365* | (2006.01) | |
| *C22C 21/00* | (2006.01) | |
| *C22C 21/12* | (2006.01) | |
| *F28D 1/053* | (2006.01) | |
| *F28F 1/12* | (2006.01) | |

(52) U.S. Cl.
CPC ............ *B23K 35/362* (2013.01); *B23K 35/365* (2013.01); *C22C 21/00* (2013.01); *C22C 21/12* (2013.01); *F28F 21/084* (2013.01); *F28D 1/05383* (2013.01); *F28F 1/126* (2013.01); *F28F 2275/04* (2013.01)
USPC ............ 428/650; 428/654; 428/658; 165/182

(56) References Cited

U.S. PATENT DOCUMENTS

| | | | |
|---|---|---|---|
| 4,991,647 | A | 2/1991 | Kawabe et al. |
| 5,251,374 | A | 10/1993 | Halstead et al. |
| 5,260,142 | A | 11/1993 | Kawabe et al. |
| 5,732,767 | A | 3/1998 | Saperstein |
| 6,193,140 | B1 | 2/2001 | Suzuki et al. |
| 6,261,706 | B1 | 7/2001 | Fukuda et al. |
| 6,451,453 | B1 | 9/2002 | Kuoza et al. |
| 6,656,296 | B2 | 12/2003 | Ren et al. |
| 7,250,223 | B2 | 7/2007 | Miyachi et al. |
| 2001/0054496 | A1 | 12/2001 | Kajikawa et al. |
| 2002/0007881 | A1 | 1/2002 | Daaland et al. |
| 2004/0040153 | A1 | 3/2004 | Ashida et al. |
| 2004/0050540 | A1 | 3/2004 | Kato et al. |
| 2005/0006065 | A1* | 1/2005 | Katsumata et al. ........... 165/133 |
| 2006/0000586 | A1 | 1/2006 | Katsumata et al. |
| 2006/0102328 | A1 | 5/2006 | Toyama et al. |
| 2006/0162918 | A1 | 7/2006 | Horiuchi et al. |
| 2008/0050269 | A1 | 2/2008 | Tanaka et al. |
| 2010/0051247 | A1 | 3/2010 | Sogabe et al. |

FOREIGN PATENT DOCUMENTS

| | | |
|---|---|---|
| CN | 1550284 | 12/2004 |
| CN | 1573275 | 2/2005 |
| CN | 1905980 | 1/2007 |
| EP | 1 475 598 A2 | 11/2004 |
| JP | 1-91962 A | 4/1989 |
| JP | 3-20594 A | 1/1991 |
| JP | 4-198694 | 7/1992 |
| JP | 5-230578 A | 9/1993 |
| JP | 7-207393 A | 8/1995 |
| JP | 8-120379 A | 5/1996 |
| JP | 8-143998 A | 6/1996 |
| JP | 10-263799 | 6/1998 |
| JP | 11 183085 | 7/1999 |
| JP | 2002-213896 A | 7/2002 |
| JP | 2002-256402 A | 9/2002 |
| JP | 2003-75024 A | 3/2003 |
| JP | 2004-042086 | 2/2004 |
| JP | 2004-232072 A | 8/2004 |
| JP | 2004 330233 | 11/2004 |
| JP | 2004-339582 | 12/2004 |
| JP | 2006 83424 | 3/2006 |
| JP | 2006 255755 | 9/2006 |
| JP | 2006-348358 A | 12/2006 |
| JP | 2007-528297 | 10/2007 |
| JP | 2009 82971 | 4/2009 |
| JP | 2009 106947 | 5/2009 |

OTHER PUBLICATIONS

Machine Translation, Asana Masazo et al., JP 2009-082971, Apr. 2009.*
Machine Translation, Hiyougo Yasunori et al., JP 11-183085, Jun. 1999.*
International Search Report Issued May 31, 2011 in PCT/JP11/54319 Filed Feb. 25, 2011.
Chinese Office Action Issued Jul. 4, 2012 in CN 200910173611.5 Filed Sep. 2, 2009 (with partial English translation).
Extended European Search Report issued Nov. 22, 2013 in Patent Application No. 09169235.0.
Office Action mailed Mar. 6, 2013, in co-pending U.S. Appl. No. 12/552,719.
Office Action mailed Aug. 22, 2013, in co-pending U.S. Appl. No. 12/552,719.
Japanese Office Action issued Sep. 3, 2013 in Patent Application No. 2009-202991 with English Translation.
US Office Action issued Apr. 25, 2014 in U.S. Appl. No. 12/552,719, filed Sep. 2, 2009.
Japan Notice of Allowance issued on Apr. 22, 2014 in Application No. 2009-202991 (w/English Language Translation).
Notice of Allowance as received in the corresponding Japanese Patent Application No. 2012-503113 dated Oct. 24, 2014 w/English Translation.

* cited by examiner

ALUMINUM ALLOY HEAT EXCHANGER

FIELD OF THE INVENTION

The present invention relates to an aluminum alloy heat exchanger, and specifically relates to an aluminum alloy heat exchanger in which detachment of fins from tubes can be suppressed.

Priority is claimed on Japanese Patent Application No. 2010-45734 filed on Mar. 2, 2010, the content of which is incorporated herein by references.

BACKGROUND ART

A heat exchanger made of aluminum alloy (aluminum alloy heat exchanger) is mainly constituted of tubes, fins, and header pipes that are brazed to each other. Conventionally, extruded tubes having a surface thermally sprayed with Zn, fins composed of a (three layered) brazing sheet having clad layers of Al—Si alloy filler on both sides has been widely used in combination in the heat exchanger.

Recently, world-wide production of inexpensive, high-quality, and high-performance product has been realized utilizing a combination of a extruded tube with a surface coating for brazing composed of Si powder, Zn-containing flux, and binder, and fins made of a bare unclad sheet (single layer sheet that does not have a brazing filler).

In the heat-exchanger made of the latter combination, sacrificial anode fins containing Zn are used as the fins, and thereby suppressing occurrence and progress of corrosion of the tubes by sacrificial anode corrosion protection effect of the fins. In addition, Zn contained in the flux of the coating for brazing diffuses during brazing and forms a sacrificial anode layer on the surface of the tube. As a result, progress of corrosion generated on the tube is suppressed, and leakage of refrigerant due to corrosion of the tube is prevented.

In addition, during the brazing process, liquid brazing filler that is formed by reaction of the coating for brazing and the tube flows towards the joint of the fin and the tube and joins the fin and the tube by forming a fillet. Thus, high heat-exchanging performance can be obtained.

Based on the above-described background art, in Patent Reference 1, the inventors proposed a heat exchanger tube with a coating for brazing formed on the outer surface of the tube, where Si powder in an amount of 1 to 5 g/m² and Zn-containing flux in an amount of 5 to 20 g/m² were contained in the coating.

Since the Si powder and the Zn-containing flux are mixed in the coating of the proposed tube, Si powder fuses during brazing and forms a liquid brazing filler, and Zn in the flux diffuses in the liquid brazing filler and is spread uniformly on the surface of the tube. Since the diffusion rate of Zn in a liquid phase such as the liquid brazing filler is remarkably higher than the diffusion rate of Zn in solid phase, a substantially uniform Zn concentration is achieved on the surface of the tube. By this process, a uniform sacrificial anode layer is formed on the surface of the tube, thereby improving the corrosion resistance of the heat exchanger tube.

PRIOR ART REFERENCE

Patent Reference

Patent Reference 1: Japanese Unexamined Patent Application, First Publication No. 2004-330233.

SUMMARY OF THE INVENTION

Problems to be Solved by the Invention

In the heat-exchanger tube of the above-described constitution, partial content of Zn included in the flux of the coating for brazing flows to the joint with the fin in accordance with flow of the liquid brazing filler formed during the brazing process. Therefore, a fillet formed in the joint of the tube and the fin contains diffused Zn.

As a result, the fillet in the joint is occasionally corroded selectively, thereby causing a possibility of detachment of the fin from the tube, where the heat exchanger is used for example in a region of a very severe corrosion environment.

As a performance of heat exchanger of this type, it is important to maintain high heat exchanging performance for a long period of time. For this purpose, it is necessary to prevent leakage of refrigerant caused by corrosion and to maintain joining of the fin and the tube for a long period of time.

Separation of the fin in the heat exchanger may cause a problem in performance of the heat exchanger tube, for example, by deterioration of heat exchanging performance, and shortening of anti-corrosion lifetime of the heat exchanger (tube) due to reduction of the corrosion protection effect of the fin.

On the other hand, if the amount of Zn added to the fin is increased so as to reduce the potential of the fin to be lower than that of the fillet, corrosion rate of the fin is increased remarkably, and thereby causing a possibility of partial loss of fins due to fin-wear due to corrosion. As a result, there has been a possibility of reduction of heat exchanging performance.

Based on the above-described circumstance, an object of the present invention is to provide a heat exchanger made of aluminum alloy in which high joining ratio of fins and tubes is exhibited, corrosion of the tube (if there is) is controlled to shallow level, and separation of the fin is inhibited.

Solution of the Problems

An aluminum alloy heat exchanger of the present invention is an aluminum alloy heat exchanger formed by assembling and brazing an aluminum alloy tube and an aluminum alloy fin to each other, wherein a coating for brazing comprising 1 to 5 g/m² of Si powder, 3 to 20 g/m² of Zn containing flux, and 0.2 to 8.3 g/m² of binder is formed on the surface of the aluminum alloy tube; the fin contains 0.8 to 2.0% by mass of Mn, Si in an amount of 1/2.5 to 1/3.5 of Mn content; less than 0.30% by mass of Fe, and Zn in an amount that is controlled in relation with the amount of the Zn containing flux in the coating for brazing to be in a region enclosed by points A, B, C, D, E, F of FIG. 5; a fillet comprising brazing filler of the coating for brazing (brazing filler formed by melting of the coating for brazing and solidification of the melt) is formed between the tube and the aluminum alloy fin after the brazing; a primary crystal portion that joins the fin and the tube is formed in the fillet; a eutectic crystal portion is formed in a portion other than the primary crystal portion; and electric potential of the primary crystal portion is set equal to electric potential of the aluminum alloy fin or higher than the electric potential of the aluminum alloy fin.

In the above-described aluminum alloy heat exchanger, the aluminum alloy tube may be composed of less than 0.1% by mass of Cu, 0.1 to 0.6% by mass of Si, 0.1 to 0.6% by mass of Fe, 0.1 to 0.6% by mass of Mn, and the balance consisting of Al and unavoidable impurities.

In the above-described aluminum alloy heat exchanger, the aluminum alloy tube may further contain at least one of 0.005 to 0.2% by mass of Ti and 0.05 to 0.2% by mass of Cr.

In the above-described heat exchanger, the aluminum alloy fin may contain one or two or more selected from 0.05 to 0.2% by mass of Zr, 0.01 to 0.2% by mass of V, 0.05 to 0.2% by mass of Ti, and 0.01 to 0.2% by mass of Cr.

Effect of the Invention

According to the aluminum alloy heat exchanger of the present invention, by controlling the amount of Zn included in the coating for brazing formed on the surface of the tube and the amount of Zn contained in the aluminum alloy fin to appropriate amounts respectively, it is possible to diffuse Zn into the fillet formed after the brazing appropriately. As a result, it is possible to provide an aluminum alloy heat exchanger in which progress of corrosion of the fillet is suppressed even when the heat exchanger is used for a long time under a corrosive environment, and separation of a fin does not occur easily.

Since the fin is not separated easily in the aluminum alloy heat exchanger of the present invention, it is possible to achieve sacrificial anode corrosion protection of the tube by the fin for a relatively long period of time. As a result, it is possible to prolong anti-corrosion service life of the tube compared to the conventional case.

Primary crystal portion to join the fin and tube is generated and eutectic crystal portion is generated in the other portion in the fillet formed after the brazing of the aluminum alloy heat exchanger of the present invention. Where the coating for brazing has the above-described composition and the aluminum alloy fin has the above-described composition, electric potential of the primary crystal portion of the fillet is equal to or higher than the electric potential of the aluminum alloy fin that is close to the fillet. As a result, the primary crystal portion of the fillet is made resistant to corrosion. By this effect, it is possible to prevent separation of fins.

MODE FOR CARRYING OUT THE INVENTION

Figure 5:
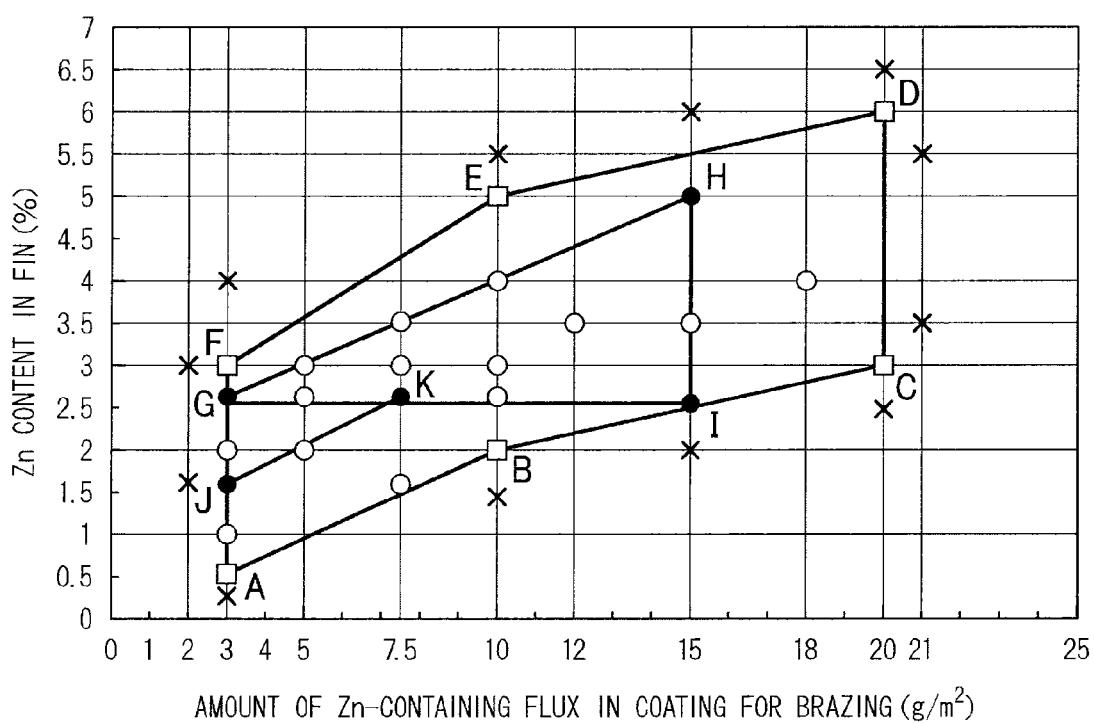
FIG. 5 is a graph that shows relation between an amount of Zn contained in aluminum alloy fin and an amount of Zn-containing flux included in the coating for brazing in the heat exchanger according to the present invention.

An aluminum alloy heat exchanger of the present invention is an aluminum alloy heat exchanger formed by assembling and brazing an aluminum alloy tube and an aluminum alloy fin to each other, wherein a coating for brazing comprising 1 to 5 g/m$^2$ of Si powder, 3 to 20 g/m$^2$ of Zn containing flux, and 0.2 to 8.3 g/m$^2$ of binder is formed on the surface of the aluminum alloy tube; the fin contains 0.8 to 2.0% by mass of Mn, Si in an amount of 1/2.5 to 1/3.5 of Mn content; less than 0.30% by mass of Fe, and Zn in an amount that is controlled in relation with the amount of the Zn containing flux in the coating for brazing to be in a region enclosed by points A, B, C, D, E, F of FIG. 5; a fillet comprising brazing filler of the coating for brazing is formed between the tube and the aluminum alloy fin after the brazing; a primary crystal portion that joins the fin and the tube is formed in the fillet; an eutectic crystal portion is formed in a portion other than the primary crystal portion; and electric potential of the primary crystal portion is set equal to electric potential of the aluminum alloy fin or higher than the electric potential of the aluminum alloy fin.

Where the electric potential of the primary crystal portion is equal to the electric potential of the aluminum alloy fin, it is acceptable if a substantially equal potential is achieved. For example, electric potential of the primary crystal portion may be lower than the electric potential of the aluminum alloy fin if the difference of the electric potentials is within 5 mV.

The inventors investigated a mechanism of corrosion in joints of constituent members of aluminum alloy heat exchanger that was mainly constituted of tubes, fins, and header pipes, and that was produced by brazing of these constituents. As a result, it was found that the above-described problems could be solved by examining a relationship between the amount of Zn-containing flux in the coating for brazing and the amount of Zn in the fin, and controlling the two amounts to be in appropriate relationship to prevent separation of a fin from the tube due to selective corrosion of a fillet at the joint of the fin.

The selective corrosion of fillet is caused by lower (basic) electric potential of the fillet than the electric potential of the sacrificial anode fin. Therefore, corrosion mechanism of a fillet was investigated in detail.

As a result of the investigation, it was discovered that the fillet 9 formed in the joint of fin and tube 3 was constituted of primary crystal portions 9a, 9b and eutectic crystal portion 9c in the above-described type of heat exchanger formed by braze-joining.

The primary crystal portions 9a, 9b are portions of a fillet 9 that have solidified firstly from the liquid brazing filler during cooling in the brazing process. The portion which has remained to be molten during the formation of the primary crystal portion constitutes the eutectic crystal portion 9c in accordance with progress of cooling. As a result of examination by the inventors, it was found that the primary crystal portions 9a, 9b thus formed in the fillet 9 had lower (basic) Zn concentration than that of the eutectic crystal portion 9c, thereby achieving high (noble) electric potential. That is, in the fillet 9, the eutectic crystal portion 9c has higher Zn concentration and is easily corroded than the primary crystal portions 9a, 9b, and the primary crystal portions 9a, 9b have lower Zn content and are not easily corroded compared to the eutectic crystal portion 9c.

As a result of investigation by the inventors, it was found that, even when the fillet containing Zn was corroded selectively, joining of a fin and a tube in a heat exchanger could be maintained for a long period of time if the primary crystal portion of low Zn concentration and high electric potential was protected from corrosion by selective (preferential) corrosion of a eutectic crystal portion 9c of the fillet.

In addition, it was found that the primary crystal portions 9a, 9c of the fillet 9 could be made resistant to corrosion by controlling the electric potential of the primary crystal portions 9a, 9b to be equal to or higher than that of the fin 4 acting as sacrificial anode in the vicinity of joint of the fin 4 and the tube 3, and that the above-described conditions could be realized by controlling each of the amount of Zn-containing flux in the coating for brazing and the amount of Zn in the fin 4 having a composition for efficiently exhibiting sacrificial anode effect.

Hereafter, the present invention is explained in detail based on the embodiment shown in the drawings.

Figure 1:
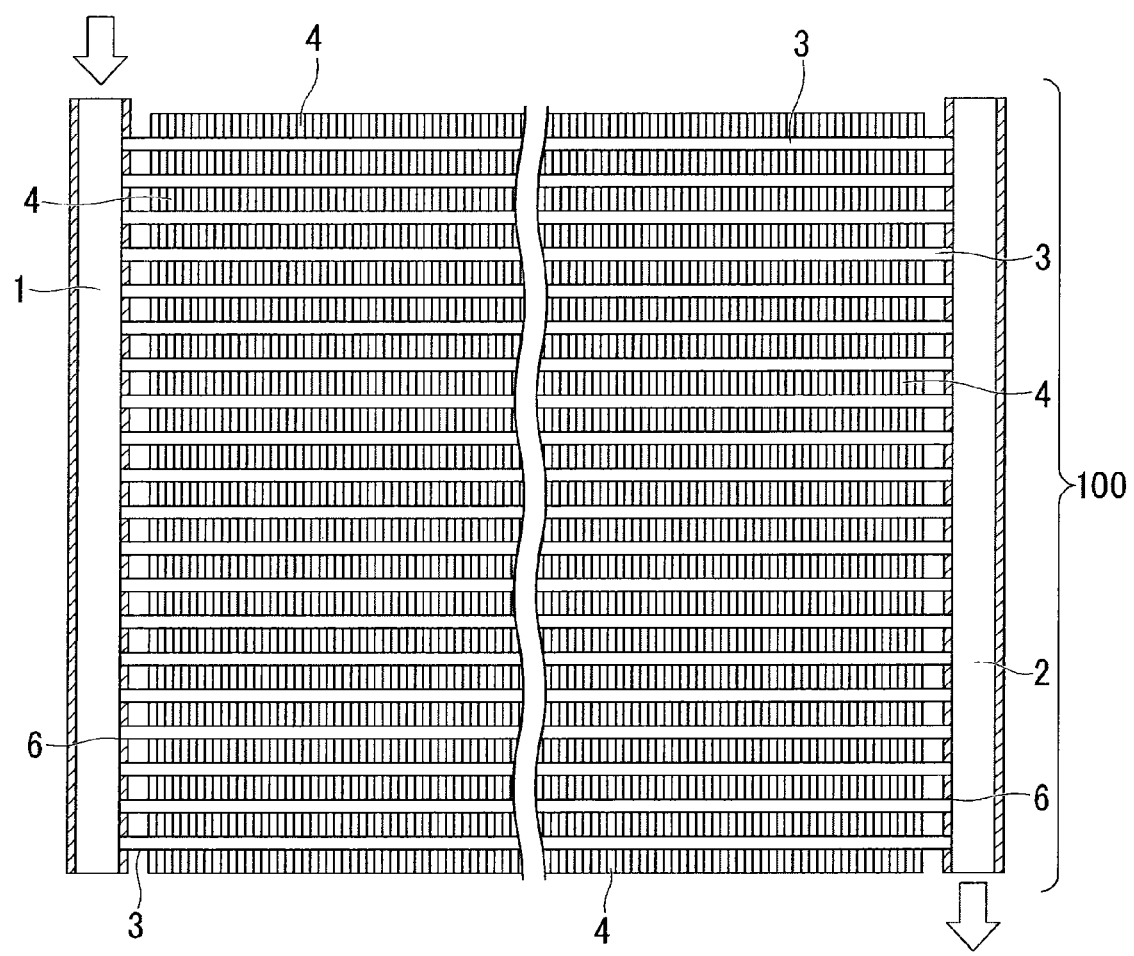
FIG. 1 is a front view that shows an example of a constitution of a heat exchanger according to the present invention.

FIG. 1 shows an embodiment of a heat exchanger according to the present invention. The heat exchanger 100 is mainly constituted of: header pipes 1, 2 that are spaced apart to left side and right side in parallel arrangement; a plurality of flat tubes 3 that are arranged in parallel with a interval in the space between the header pipes and that are joined with right angle to the header pipes 1, 2; and corrugated fins 4 provided to each of the tubes. The header pipes 1, 2, tubes 3, and fins 4 are constituted of the below-described aluminum alloys.

Figure 2:
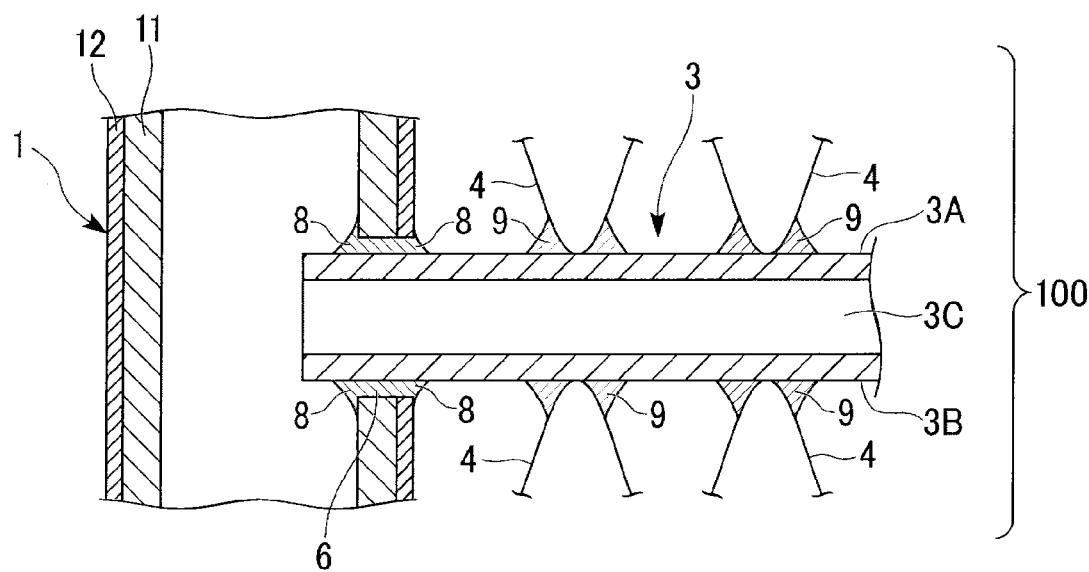
FIG. 2 is a partial enlarged view of a heat exchanger according to the present invention and shows a state after assembling and brazing header pipes, tubes and fins.

More specifically, a plurality of slits 6 are formed with a predetermined interval along longitudinal direction in the sides of the header pipes 1, 2 opposed to each other, and the header pipes 3 are bridged by the tubes 3 by inserting ends of each tube 3 to the opposed slits 6 of the header pipes 1, 2. Fins 4 are arranged between the plurality of tubes 3, 3 that are disposed between the header pipes 1, 2 with a predetermined interval. These fins 4 are brazed to a front (upper) surface or a back (lower) surface of the tube 3. As shown in FIG. 2, a fillet 8 is formed of brazing filler in each of the portions where the ends of the tubes 3 are inserted to the slits 6 of the header pipes 1, 2, and the tubes 3 are brazed to the header pipes 1, 2. Ridges of the corrugated fins 4 are opposed to the front surface or the back surface of the tubes 3 and fillets formed of brazing filler are formed therebetween. Thus, fins 4 are brazed to the front surface and the back surface of the tubes 3.

As explained in the below description of the production method, the heat exchanger 100 of this form is produced by forming a heat exchanger assembled body 101 as shown in FIG. 2 by assembling header pipes 1, 2, a plurality of tubes 3 disposed between the header pipes 1, 2, and a plurality of fins, and subjecting the assembled body 101 to brazing.

At a state before the brazing, the front surface and the back surface of the tube 3 to which the fin 4 is joined are coated with a coating for brazing including 1 to 5 $g/m^2$ of Si powder, 3 to 20 $g/m^2$ of Zn-containing flux ($KZnF_3$), and 0.2 to 8.3 $g/m^2$ of binder (for example, an acrylic based resin).

The tube 3 of the present embodiment is constituted as a flat multi-port tube that has a plurality of path formed inside and has a flat front surface (upper surface) 3A and a flat back surface (lower surface) 3B, and side surfaces adjacent to the front surface 3A and the back surface 3B. As an embodiment, a coating 7 for brazing is formed on each of the front surface 3A and the back surface 3B of the tube before the brazing.

Hereafter, a composition constituting the coating for brazing is explained.

<Si Powder>

Si powder reacts with Al as a component of the tube 3 and forms a brazing filler that joins the fin 4 and the tube 3. The Si powder melts in the brazing process and forms liquid brazing filler. Zn in the flux diffuses in the liquid brazing filler and is spread uniformly over the surface of the tube 3. Since diffusion rate of Zn in the liquid brazing filler, a liquid phase, is remarkably higher than the diffusion rate of Zn in a solid phase, substantially uniform Zn concentration is achieved on the surface of the tube 3. Thus formed uniform Zn diffusion layer improves corrosion resistance of the tube 3.

Coated Amount of Si Powder: 1 to 5 $g/m^2$.

Where the coated amount of Si powder is smaller than 1 $g/m^2$, brazability is deteriorated. On the other hand, where the coated amount of Si powder exceeds 5 $g/m^2$, due to formation of excessive brazing filler, Zn tends to concentrate in the fillet, and unreacted Si residue occurs, resulting in large corrosion depth and failing to achieve intended effect for preventing separation of fins. Therefore, the amount of Si powder included in the coating is set to be 1 to 5 $g/m^2$. Preferably, the amount of Si powder is 1.5 to 4.5 $g/m^2$, and more preferably, 2.0 to 4.0 $g/m^2$. As an example, the particle size of the Si powder is controlled to be 15 μm or less in D(99), where D(99) denotes a diameter at which cumulative particle size distribution from smaller size reaches 99% by volume.

<Zn Containing Flux>

Zn containing flux has an effect of forming Zn diffused layer on the surface of the tube 3 during brazing process and improves the corrosion resistance. In addition, the flux has an effect of removing oxide on the surface of the tube during the brazing process to enhance spreading and wetting of the brazing filler, thereby improving brazability. Since the Zn containing flux has higher activity than the flux not containing Zn, it is possible to achieve satisfactory brazability even where relatively fine Si powder is used.

Coated Amount of Zn Containing Flux: 3 to 20 $g/m^2$

Where the coated amount of Zn-containing flux is smaller than 3 $g/m^2$, a sufficient Zn diffused layer is not formed and corrosion resistance of the tube 3 is deteriorated. In addition, defective brazing is caused by insufficient deformation and removal of the surface oxide film of a member to be brazed (tube 3). On the other hand, where the coated amount exceeds 20 $g/m^2$, Zn concentrates remarkably in the primary crystal portion 9a, 9b of the fillet, deteriorating the corrosion resistance of the fillet and accelerating separation of the fin. Therefore, coated amount of Zn-containing flux is controlled to be 3 to 20 $g/m^2$. Preferably, amount of Zn-containing flux in the coating is 4 to 18 $g/m^2$, more preferably, 5 to 15 $g/m^2$.

The amount of Zn-containing flux in the coating 7 for brazing has strong correlation with the Zn content in the fin 4. The relationship is explained in detail in the below description.

Preferably, $KZnF_3$ is used as a main component of the Zn-containing flux. Alternatively, it is possible to use mixed type flux in which $KZnF_3$ is mixed with, where necessary, Zn-free flux such as $K_{1-3}AlF_{4-6}$, $Cs_{0.02}K_{1-2}AlF_{4-5}$, $AlF_3$, $KF$, and $K_2SiF_6$. The amount of coating is controlled such that the amount of Zn-containing flux is in the range of 3 to 20 $g/m^2$.

Preferably, amount of Zn in the Zn-containing flux is in the range of 35 to 45% by mass.

<Binder>

In addition to the Si powder and the Zn-containing flux, the coating composition includes binder. Preferably, acrylic based resin can be applied as an example of the binder.

Coated Amount of Binder: 0.2 to 8.3 $g/m^2$

Where the amount of binder in the coating is smaller than 0.2 $g/m^2$, workability (exfoliation resistance of the coating) is deteriorated. On the other hand, if the amount of binder in the coating exceeds 8.3 $g/m^2$, brazability is deteriorated. Therefore, the coated amount of binder is controlled to be 0.2 to 8.3 $g/m^2$. In general, the binder is lost by evaporation by the heating during the brazing process. A preferable amount of binder in the coating is 0.4 to 6.0 $g/m^2$, and more preferably 0.5 to 5.0 $g/m^2$.

A method of applying the brazing composition comprising the Si powder, flux, and binder is not limited in the present invention. It is possible to use appropriate method, for example, selected from a spray method, a shower method, a flow-coater method, a roll-coater method, a brash painting method, a dipping method, and a electrostatic painting method. The area for coating the brazing composition may be the whole surface of the tube or a partial surface of the tube. It is acceptable if the surface region of the tube 3 required for brazing the fin is coated with the composition.

The tube 3 is made of an aluminum alloy that is composed of, in % by mass, less than 0.1% of Cu and the balance being aluminum and unavoidable impurities. Where necessary, the aluminum alloy of the tube may further contains, in % by mas, 0.1 to 0.6% of Si, 0.1 to 0.6% of Fe, and 0.1 to 0.6% of Mn. The tube 3 is produced by extrusion process of the aluminum alloy.

Hereafter, a reason for limiting constituent elements of aluminum alloy of the tube is explained.

<Cu: Less than 0.1%>

Cu is an element that has influence on the corrosion resistance of the tube 3. Although no problem is caused where the Cu content is less than 0.1%, Cu content exceeding 0.1% tends to deteriorate corrosion resistance. On the other hand, addition of Cu improves the strength of the tube 3. Therefore, Cu may be added in an amount of less than 0.1%.

<Mn: 0.1 to 0.6%>

Mn is an element that improves corrosion resistance and mechanical strength of the tube 3. Mn also improves extrudability during the extrusion process. Further, Mn has an effect of suppressing fluidity of the liquid brazing filler and suppress the difference in Zn concentration between the fillet and the tube surface.

Where the Mn content is less than 0.1%, effect of improving corrosion resistance and the strength is insufficient, and the effect of suppressing fluidity of liquid brazing filler is reduced. On the other hand, where the Mn is contained in excess of 0.6%, the extrudability is deteriorated due to increase of extrusion pressure. Therefore, in the present invention, the Mn content is preferably controlled to be 0.1 to 0.6%. A more preferable Mn content is 0.15 to 0.5%, and more preferably, 0.2 to 0.4%.

<Si: 0.1 to 0.6%>

Si is an element that has an effect of improving strength and corrosion resistance like as Mn.

Where the Si content is smaller than 0.1%, the effect of improving the corrosion resistance and the strength cannot be achieved sufficiently. On the other hand, a Si content exceeding 0.6% deteriorates extrudability. Therefore, in the present invention, the Si content in the tube 3 is preferably controlled to be 0.1 to 0.6%. A more preferable Si content is 0.15 to 0.5%, and more preferably, 0.2 to 0.45%.

<Fe: 0.1 to 0.6%>

Fe is an element that has an effect of improving the strength and the corrosion resistance like as Mn.

Where the Fe content is smaller than 0.1%, the effect of improving the corrosion resistance and the strength cannot be achieved sufficiently. On the other hand, the Fe content exceeding 0.6% deteriorates extrudability. Therefore, in the present invention, Fe content in the tube 3 is preferably controlled to be 0.1 to 0.6%. A more preferable Fe content is 0.15 to 0.5%, and more preferably, 0.2 to 0.4%.

<Ti: 0.005 to 0.2%, Cr: 0.05 to 0.2%>

Ti and Cr are elements which may be contained where necessary, and improve corrosion resistance of the tube 3. However, where the contents of these elements exceeds the above-described range, the extrudability of the alloy tends to be deteriorated.

Next, fin 4 is explained.

The fin 4 joined to the tube 3 is made of an aluminum alloy that contains, in % by mass, Mn: 0.8 to 2.0%, Si: 1/2.5 to 1/3.5 of the Mn content, Zn: an amount defined by the range enclosed by points A, B, C, D, E, F shown in FIG. 5, Fe: less than 0.3%, and further contains, where necessary, one or two or more selected from Zr: 0.05 to 0.2%, V: 0.01 to 0.2%, Ti: 0.05 to 0.2%, Cr: 0.01 to 0.2%, and the balance being Al and unavoidable impurities. Explanation for the region enclosed by points A, B, C, D, E, F shown in FIG. 5 will be described afterwards.

In the preparation of fin 4, aluminum alloy having the above-described composition is formed of melt in accordance with a common method, and is worked to a corrugated shape through hot-rolling, cold rolling, or the like. The production method of the fin 4 is not limited in the present invention, and known methods may be applied in the production of fin 4. Hereafter, limitation of constituent elements of the aluminum alloy of the fin is explained.

<Mn: 0.8 to 2.0%>

Mn improves high temperature strength and room temperature strength of the fin 4.

Where the Mn content is less than 0.8%, the effect of improving high temperature strength and room temperature strength cannot be achieved sufficiently. On the other hand, where the Mn content exceeds 2.0%, sufficient workability cannot be obtained in the preparation process of the fin 4. Therefore, the Mn content in the alloy of constituting the fin is controlled to be 0.8 to 2.0%. A preferable Mn content is 0.9 to 1.9%, more preferably, 1.0 to 1.8%.

<Si: 1/2.5 to 1/3.5 of the Mn Content>

Where the alloy contains Si, Si forms compounds with Mn and exhibits the above-described effect of Zn and effect of improving strength. Where the content of Si exceeds the above-described range, separation of the fin tends to occur. A preferable Si content is 1/2.6 to 1/3.6 of the Mn content, more preferably, 1/2.8 to 1/3.2 of the Mn content.

<Fe: Less than 0.30%>

Where the amount of Fe exceeds 0.30%, workability in the preparation process of the fin 4 and the corrosion resistance of the fin 4 are deteriorated. On the other hand, Fe improves the high temperature strength and room temperature strength of the Fin 4. Therefore, Fe may be contained in the fin 4 in an amount more than 0% and less than 0.30%.

<Zn Content>

By making the fin 4 contain Zn, it is possible to reduce the electric potential of the fin 4 and to provide sacrificial anode corrosion protection effect to the fin 4.

It is necessary to control the amount of Zn in the fin 4 to be, in % by mass, not less than 0.5% and not more than 6%. Where the Zn content in the fin 4 is less than 0.5%, separation of fin 4 tends to occur. Where Zn content exceeds 6%, corrosion resistance of the fin 4 itself tends to be deteriorated.

Further, based on the below described reason, Zn content of the fin 4 is required to satisfy the specific range enclosed by points A, B, C, D, E, and F shown in FIG. 5 in correlation with the above-described amount of Zn-containing flux.

Figure 4:
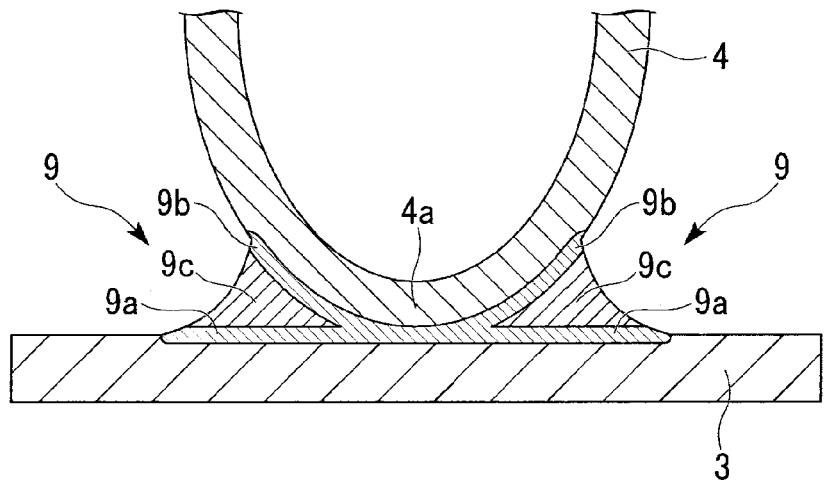
FIG. 4 is a partial enlarged cross-sectional view of a heat exchanger of the present invention for explaining occurrence of primary crystal portion and eutectic crystal portion in the joint where a fin and a tube are joined via a fillet.

FIG. 4 shows a partial enlarged view indicating a state where a fillet 9 is formed in the joint of the tube 3 and the fin 4 after the brazing. In the fillet 9, primary crystal portion 9a is formed in the vicinity of the tube 3, primary crystal portion 9b is formed in the vicinity of the fin 4, and eutectic crystal portion 9c is formed in the region between the primary crystal portions 9a and 9b. This occurrence is explained as follows.

The coating 7 for brazing is molten by the heating in the time of brazing, and forms liquid brazing filler that flows towards the joint of fin 4 and tube 3 and forms the fillet 9.

Therefore, during the brazing, fillet 9 has a liquid state, and fin 4 and the tube 3 have solid state.

The liquid fillet 9 is solidified in the subsequent cooling process. Firstly, portions in contact with solid fin 4 and tube 3 start to solidify while crystallizing primary crystals, and form the primary crystal portions 9a, 9b. Finally, the portion apart from the fin 4 and the tube 3 is solidified forming the eutectic crystal portion 9c.

Therefore, in the metal texture shown by the fillet, the center portion 4a at which the tube 3 and the fin 4 is mostly closed is almost composed of the primary crystal portions 9a, 9b, and volume of the eutectic crystal portion 9c increases towards the periphery of the fillet where the tube 3 and the fin 4 are spaced apart. In addition, since component of the liquid brazing filler formed by the heating during the brazing partially diffuses to the surface of the tube 3 and to the surface of the fin 4, the primary crystal portion 9a occurs in a state slightly eroding the surface of the tube 3 from the lower end of the fillet 9, and the primary crystal portion 9b occurs in a state slightly eroding the surface of the fin 4 from the upper end of the fillet 9.

In the present invention, based on the observation of the above-described separated formation of the primary crystal portions 9a, 9b, and the eutectic crystal portion in the fillet 9, the following finding was obtained. It is effective to diffuse a appropriate amount of Zn in the primary crystal portions 9a, 9b in order to inhibit separation of the fin 4 effectively. In the present embodiment, it is important to control the amount of Zn containing flux in the coating 7 for brazing and the Zn content in the fin 4 to be in specific relationship based on the above-described finding.

Specifically, where the amount of Zn containing flux (unit: $g/m^2$) is shown by the horizontal axis, and the Zn content (unit: % by mass) in the fin 4 is shown by the vertical axis as shown in FIG. 5, it is necessary to control the amount Zn containing flux and the Zn content in the fin 4 to be in the range enclosed by points A, B, C, D, E, and F, where A denotes the amount of the Zn containing flux: 3 $g/m^2$ and the Zn content in the fin 4: 0.5% by mass, B denotes the amount of the Zn containing flux: 10 $g/m^2$ and the Zn content in the fin 4: 2% by mass, C denotes the amount of the Zn containing flux: 20 $g/m^2$ and the Zn content in the fin 4: 3% by mass, D denotes the amount of the Zn containing flux: 20 $g/m^2$ and Zn content in the fin 4: 6% by mass, E denotes the amount of the Zn containing flux: 10 $g/m^2$ and Zn content in the fin 4: 5% by mass, and F denotes the amount of the Zn containing flux: 3 $g/m^2$ and the Zn content in the fin 4: 3% by mass.

By controlling the amount of Zn containing flux and the Zn content in the fin 4 to be in the range enclosed by the points A, B, C, D, E, and F shown in FIG. 5, it is possible to diffuse appropriate amount of Zn in the primary crystal portions 9a, 9b of the fillet, and to make the primary crystal portions 9a, 9b resistant to corrosion.

In the range enclosed by the points A, B, C, D, E, and F shown in FIG. 5, the most preferable range is the triangle range enclosed by the points G, I, and H, where G denotes the amount of the Zn containing flux: 3 $g/m^2$ and the Zn content in the fin 4: 2.6% by mass, I denotes the amount of the Zn containing flux: 15 $g/m^2$ and the Zn content in the fin 4: 2.6% by mass, and H denotes the amount of the Zn containing flux: 15 $g/m^2$ and the Zn content in the fin 4: 5% by mass. Next to the above-described range enclosed by the points G, H, and I, the triangle range enclosed by the points G, J, and K is preferable, where G denotes the amount of the Zn containing flux: 3 $g/m^2$ and the Zn content in the fin 4: 2.6% by mass, J denotes the amount of the Zn containing flux: 3 $g/m^2$ and the Zn content in the fin 4: 1.6% by mass, and K denotes the amount of the Zn containing flux: 7.5 $g/m^2$ and the Zn content in the fin 4: 2.6% by mass.

<Zr: 0.05 to 0.2%>

Zr is an element which may be contained in the fin 4 where necessary, and improves the high temperature strength and the room temperature strength of the fin 4 like as Fe.

Where the amount of Zr is less than 0.05%, it is impossible to achieve the effect of improving high temperature strength and room temperature strength. On the other hand, where the Zr content exceeds 0.2%, workability in preparation process of the fin is deteriorated. Therefore, the Zr content in the present embodiment can be controlled to be in the range of not less than 0.05% and not more than 0.2%.

<V: 0.01 to 0.2%>

V is an element which may be contained in the fin 4 where necessary, and improves high temperature strength and room temperature strength of the fin 4 like as Fe.

Where the amount of V is less than 0.01%, it is impossible to achieve the effect of improving high temperature strength and room temperature strength. On the other hand, where the V content exceeds 0.2%, workability in preparation process of the fin is deteriorated. Therefore, the V content in the present embodiment can be controlled to be in the range of not less than 0.01% and not more than 0.2%. A preferable V content is 0.05 to 0.18%, and more preferably, 0.10 to 0.15%.

<Cr: 0.01 to 0.2%>

Cr is an element which may be contained in the fin 4 where necessary, and improves the high temperature strength and the room temperature strength of the fin 4 like as Fe.

Where the amount of Cr is less than 0.01%, it is impossible to achieve the effect of improving the high temperature strength and the room temperature strength. On the other hand, where the Cr content exceeds 0.2%, the workability in the preparation process of the fin is deteriorated. Therefore, the Cr content in the present embodiment can be controlled to be in the range of not less than 0.01% and not more than 0.2%. A preferable Cr content is 0.05 to 0.18%, and more preferably, 0.10 to 0.15%.

In the present embodiment, one or two or more of Zr, V, Ti, and Cr may be contained where necessary.

Next, the header pipe 1 is explained.

Figure 3:
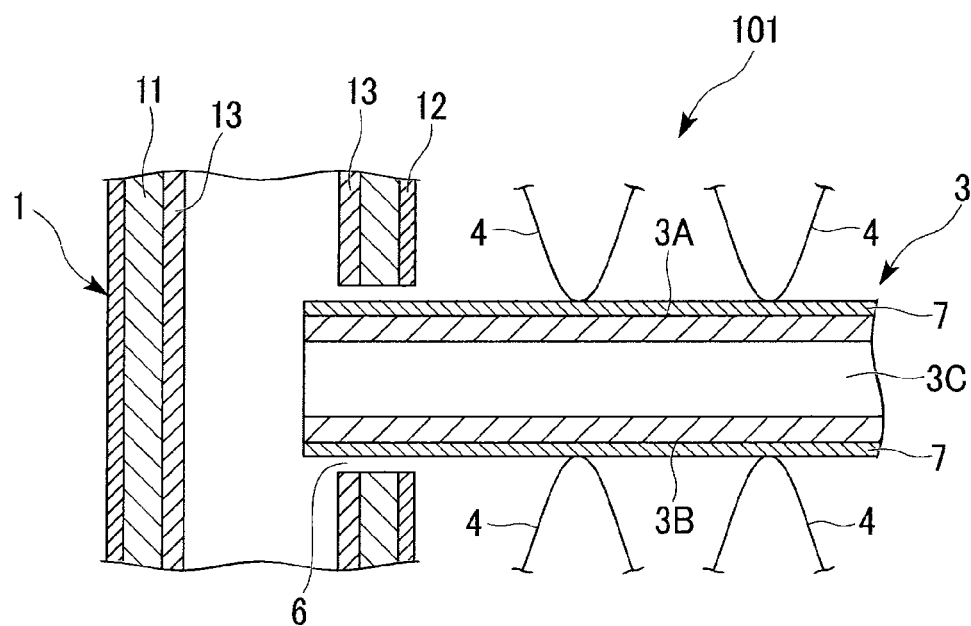
FIG. 3 is a partial enlarged view that shows a state in which header pipes, tubes, and fins are assembled before brazing

As shown in FIG. 2 and FIG. 3, the header pipe 1 preferably has a three layered structure composed of core member layer 11, sacrificial anode layer 12 formed in the outer periphery of the core member, and brazing filler layer 13 formed in the inner periphery of the core member.

By forming the sacrificial anode layer 12 in the outer periphery of the core member layer 11, it is possible to achieve corrosion protection effect by the header pipe 1 in addition to the corrosion protection effect by the fin 4. Therefore, it is possible to enhance the effect of sacrificial anode corrosion protection of the tube 3 in the vicinity of the header pipe 1.

Preferably, the core member 11 is constituted of an Al—Mn based alloy.

For example, it is preferable that the alloy contains 0.05 to 1.50% of Mn, and may further contain additional elements selected from 0.05 to 0.8% of Cu, and 0.05 to 0.15% of Zr.

The sacrificial anode layer 12 formed in the outer periphery of the core member layer 11 is preferably constituted of an aluminum alloy composed of 0.6 to 1.2% of Zn, and the balance being Al and unavoidable impurities. The sacrificial anode layer 12 is formed integral with the core member layer by clad-rolling.

The structure and composition of the header pipe 1 explained in the present embodiment is one of examples. The structure and composition of the header pipe 1 applied in the present embodiment may be selected from those applied in general heat exchangers.

A method of producing a heat exchanger 100 mainly constituted of the above-explained header pipes 1, 2, tubes 3 and fins 4 is explained in the following.

FIG. 3 is a partial enlarged view of a heat exchanger assembly (assembled body of heat exchanger elements) 101 that shows a state in which header pips 1, 2, tube 3, and fins 4 are assembled using the tubes 3 coated with a coating for brazing on the surface to be joined with the fin 4. The figure shows a state before brazing by heating. In the heat exchanger assembly shown in FIG. 3, an end of the tube 3 is inserted to the slit formed in the header pipe 1 so as to install the tube.

When the heat exchanger assembly constituted of header pipes 1, 2, tubes 3, and fins 4 as constructed as shown in FIG. 3 is heated to a temperature not lower than melting point of the brazing filler and is cooled after the heating, as shown in FIG. 2, brazing filler layer 13 and the coating 7 for brazing are molten and the header pipe 1 and the tube 3, the tube and the fin 4 are joined respectively. Thus, a heat exchanger 100 having a constitution as shown in FIG. 1 and FIG. 2 is obtained. At that time, the brazing filler layer 13 in the inner periphery of the header pipe 1 is molten and flows to the vicinity of the slit 6 and forms a fillet 8 thereby joining the header pipe 1 and the tube 3. In addition, the coating 7 for brazing on the surface of the tube 3 is molten and flows to the vicinity of the fin 4 by capillary force and forms a fillet 9 thereby joining the tube 3 and the fin 4.

In the time of brazing, the coating 7 for brazing and the brazing filler layer 13 are molten by heating to an appropriate temperature in an appropriate atmosphere such as inert atmosphere. Then, the activity of the flux is enhanced, and Zn in the flux precipitates to the surface of the member (tube 3) to be brazed, and is diffused to the direction of wall-thickness of the tube. In addition, the flux decomposes oxide films of both of the brazing filler surface and surface of the member to be brazed, thereby enhancing wetting of the brazing filler and the member to be brazed.

Conditions of brazing are not particularly limited. For example, the brazing may be performed by controlling the interior of the furnace to be nitrogen atmosphere, heating the heat exchanger assembly to a brazing temperature (substantial attainment temperature) of 580 to 620° C. with heating rate of not smaller than 5° C./minute, maintaining the assembly at the brazing temperature for 30 seconds or longer, and cooling the assembly while controlling the cooling rate from the brazing temperature to 400° C. to 10° C./minute or more.

In the time of brazing, partial portions of the matrices of the aluminum alloys constituting the tube 3 and the fin 4 react with the composition in the coating 7 for brazing applied on the surface of the tube 3 and form a brazing filler thereby brazing the tube 3 and the fin 4.

On the surface of the tube 3, Zn in the flux diffuses in the brazing process and make the surface of the tube 3 to be basic compared to the interior of the tube 3. In the fillet 9, the Zn concentration in the primary crystal portions 9a and 9b is lower than that of the eutectic crystal portion 9c, thereby providing a noble electric potential to the primary crystal portions 9a and 9b compared to the eutectic crystal portion 9c in the fillet 9. As a result, the primary crystal portions 9a, 9b are made resistant to corrosion Further, since the relationship between the amount of Zn-containing flux in the coating 7 for brazing and the Zn content in the fin 4 is controlled to be in the range enclosed by the points A, B, C, D, E, and F as described above, the primary crystal portions 9a and 9b are made to have noble electric potential compared to the fin 4. Therefore, the primary crystal portions 9a, 9b are not easily corroded in the achieved structure. In addition, it is possible to control such that excessive Zn content is not diffused to the primary crystal portions 9a, 9b in the time of brazing. Therefore, electric potential of the primary crystal portions 9a and 9b is made higher than the electric potential of the aluminum alloy fin 4.

According to the present embodiment, satisfactory brazing is performed while avoiding residual Si powder in the brazing process. The fillet 9 is securely formed between the tube 3 and the fin 4, and the primary crystal portions 9a, 9b are made resistant to corrosion.

In the thus obtained heat exchanger 100, an appropriate Zn layer is formed on the surface of the tube 3 and pitting corrosion is prevented. In addition, corrosion of the primary crystal portions 9a, 9b of the fillet is suppressed, and joining of the tube 3 and the fin 4 can be maintained for a long time. As a result, satisfactory heat exchanging performance is maintained.

EXAMPLE

Al alloys for tube each having a composition shown in Table 1 and Al alloys for fin each having a composition shown in Table 2 were prepared from molten alloys.

Figure 8:
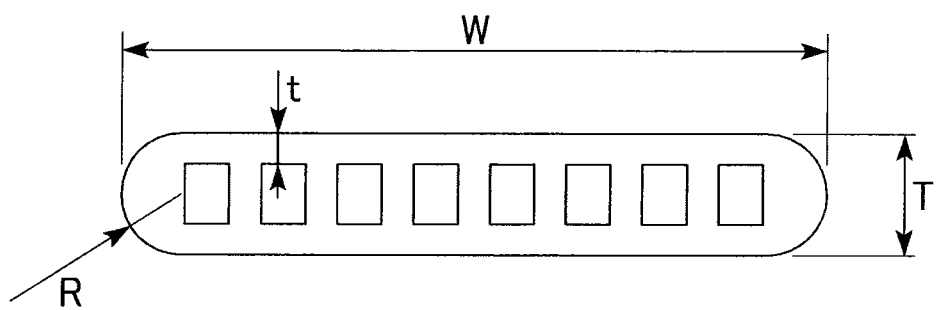
FIG. 8 is a schematic view that shows lateral cross section of a tube used in an example of the present invention.

After a heat treatment for homogenization of the Al alloy for tube, a flat tube 30 having a lateral cross sectional shape (a wall thickness t: 0.30 mm, a width W: 18.0 mm, a total thickness T: 1.5 mm, and a corner curvature radius: 0.75 mm) as shown on FIG. 8 was prepared by hot extrusion of the Al alloy.

After a heat treatment for homogenization of the Al alloy for fin, a plate of 0.08 mm in thickness was obtained by hot-rolling and cold rolling the alloy. By corrugate working of the plate, the fin 40 as shown in FIG. 6 was prepared.

Next, brazing filler composition was roll-coated on the surface of the tube 30 and was dried.

The brazing composition is a paint comprising Si powder (2.8 μm in D(50)), flux ($KZnF_3$: 3.0 μm in D(50), where D(50) is a diameter at which cumulative particle size distribution from smaller size reaches 50%), binder (acrylic resin), and solvent (including alcohol group such as isopropyl alcohol). The mixed ratio in each of the brazing composition was controlled such that the amount of each component in the coating for brazing after painting and drying has a value as shown in Table 3, Table 4, and Table 5.

Figure 6:
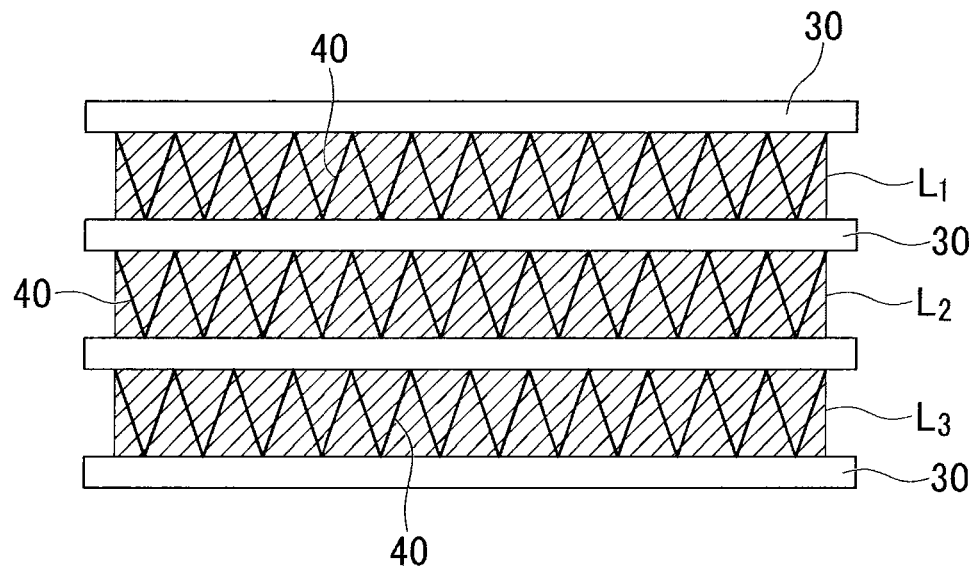
FIG. 6 is a side view that schematically shows a joint of a tube and a fin in an example of a heat exchanger according to the present invention.

The tube 30 and fin 40 were assembled as shown in FIG. 6 as a partial section of a heat exchanger, and brazing was performed by heating the assembly to 600° C., maintaining the assembly at that temperature for 2 minutes, and subsequently cooling the assembly.

In each case, brazing was performed in nitrogen atmosphere.

The tube and fin after the brazing were subjected to corrosion test of SWAAT for 30 days. After the corrosion test, maximum corrosion depth formed of the tube was measured. In addition, the corrosion product was removed after the corrosion testing and area ratio (%) of a portion 45 where the fin was separated or absent as shown in FIG. 7 was determined.

Figure 7:
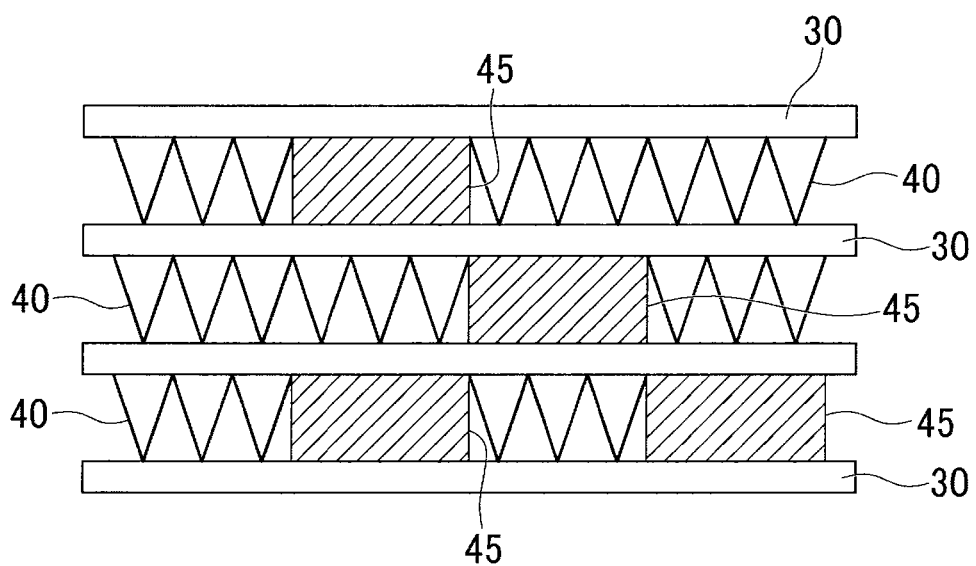
FIG. 7 is a side view that schematically shows a structure of an example in which separation of fin occurred after the corrosion.

Separation ratio (%) of the fin is a value obtained by (total area of separation ratio of fins after the corrosion test: total area of the portion shown by symbol 45 in FIG. 7)/(total area of the fin before corrosion: area of regions $L_1+L_2+L_3$ shown in FIG. 6)×100.

Electric potential of the primary crystal portion of the fillet, the electric potential of the fin, the corrosion depth of the tube, and the separation ratio of the fins for each of samples No. 1 to 57 after the brazing are shown in Table 6, Table 7, and Table 8.

TABLE 1

| | Mn (mass %) | Si (mass %) | Fe (mass %) | Cu (mass %) | Cr (mass %) | Ti (mass %) | Al |
|---|---|---|---|---|---|---|---|
| tube 1 | 0.3 | 0.4 | 0.3 | 0.05 | — | — | balance |
| tube 2 | 0.3 | 0.4 | 0.3 | 0.15 | — | — | balance |
| tube 3 | 0.3 | 0.4 | 0.3 | 0.05 | 0.15 | — | balance |
| tube 4 | 0.3 | 0.4 | 0.3 | 0.05 | — | 0.15 | balance |
| tube 5 | 0.3 | 0.4 | 0.3 | 0.05 | 0.10 | 0.10 | balance |

TABLE 2

| Fin No. | Mn (mass %) | Si (mass %) | Fe (mass %) | Zn (mass %) | Zr, V, Ti, Cr (mass %) | Al | Remarks |
|---|---|---|---|---|---|---|---|
| 1 | 1.5 | 0.5 | 0.15 | 0.3 | | balance | Zn: less than lower limit |
| 2 | 1.5 | 0.5 | 0.15 | 0.5 | V: 0.05 | balance | Zn: lower limite |
| 3 | 1.5 | 0.5 | 0.15 | 1.0 | | balance | |
| 4 | 1.0 | 0.3 | 0.25 | 1.6 | Zr: 0.05 | balance | |
| 5 | 1.5 | 0.5 | 0.15 | 1.6 | | balance | |
| 6 | 1.5 | 0.5 | 0.15 | 2.0 | | balance | |
| 7 | 1.2 | 0.4 | 0.15 | 2.6 | Zr: 0.1, Ti: 0.1 | balance | |
| 8 | 1.5 | 0.5 | 0.15 | 2.6 | | balance | |
| 9 | 1.8 | 0.6 | 0.20 | 3.0 | | balance | |
| 10 | 1.5 | 0.5 | 0.15 | 3.0 | | balance | |
| 11 | 1.5 | 0.5 | 0.15 | 3.5 | | balance | |
| 12 | 1.5 | 0.5 | 0.15 | 4.0 | | balance | |
| 13 | 1.5 | 0.5 | 0.15 | 5.0 | | balance | |
| 14 | 1.5 | 0.5 | 0.15 | 5.5 | | balance | |
| 15 | 1.5 | 0.5 | 0.15 | 6.0 | Cr: 0.15 | balance | Zn: upper limit |
| 16 | 1.5 | 0.5 | 0.15 | 2.6 | | balance | Zn exceeds upper limit |
| 17 | 1.5 | 0.5 | 0.40 | 2.6 | | balance | Fe exceeds upper limit |
| 18 | 1.5 | 0.5 | 0.29 | 2.6 | | balance | Fe: upper limit |
| 19 | 1.5 | 0.6 | 0.20 | 2.6 | | balance | Si: upper limit |
| 20 | 1.5 | 0.43 | 0.20 | 2.6 | | balance | Si: lower limit |
| 21 | 1.5 | 0.75 | 0.20 | 2.6 | | balance | Si exceeds upper limit |
| 22 | 1.5 | 0.40 | 0.20 | 2.6 | | balance | Si is less than lower limit |
| 23 | 2.0 | 0.7 | 0.20 | 2.6 | | balance | Mn: upper limit |
| 24 | 0.8 | 0.3 | 0.20 | 2.6 | Zr: 0.2 | balance | Mn: lower limit |
| 25 | 2.2 | 0.7 | 0.20 | 2.6 | | balance | Mn: exceeds upper limit |
| 26 | 0.6 | 0.2 | 0.20 | 2.6 | Zr: 0.15 | balance | Mn: less than lower limit |

TABLE 3

| Sample No. | Tube No. | Fin No. | Coating for brazing (g/m²) Si powder | Binder | Zn flux | Zn content in Fin (mass %) |
|---|---|---|---|---|---|---|
| 1 | 1 | 4 | 1.5 | 1.0 | 2 | 1.6 |
| 2 | 1 | 9 | 1.5 | 1.0 | 2 | 3.0 |
| 3 | 1 | 1 | 2.0 | 1.0 | 3 | 0.3 |
| 4 | 1 | 2 | 2.0 | 1.0 | 3 | 0.5 |
| 5 | 1 | 3 | 2.0 | 1.0 | 3 | 1.0 |
| 6 | 1 | 4 | 2.0 | 1.0 | 3 | 1.6 |
| 7 | 1 | 6 | 2.0 | 1.0 | 3 | 2.0 |
| 8 | 1 | 8 | 2.0 | 1.0 | 3 | 2.6 |
| 9 | 1 | 9 | 2.0 | 1.0 | 3 | 3.0 |
| 10 | 1 | 12 | 2.0 | 1.0 | 3 | 4.0 |
| 11 | 1 | 5 | 2.5 | 1.0 | 5 | 1.6 |
| 12 | 1 | 6 | 2.5 | 1.0 | 5 | 2.0 |
| 13 | 1 | 7 | 2.5 | 1.0 | 5 | 2.6 |
| 14 | 1 | 10 | 2.5 | 1.0 | 5 | 3.0 |
| 15 | 1 | 5 | 3.0 | 1.5 | 7.5 | 1.6 |
| 16 | 1 | 8 | 3.0 | 1.5 | 7.5 | 2.6 |
| 17 | 1 | 9 | 3.0 | 1.5 | 7.5 | 3.0 |
| 18 | 1 | 11 | 3.0 | 1.5 | 7.5 | 3.5 |

TABLE 4

| Sample No. | Tube No. | Fin No. | Coating for brazing (g/m²) Si powder | Binder | Zn flux | Zn content in Fin (mass %) |
|---|---|---|---|---|---|---|
| 19 | 1 | 5 | 3.0 | 2.0 | 10 | 1.6 |
| 20 | 1 | 6 | 3.0 | 2.0 | 10 | 2.0 |
| 21 | 1 | 7 | 3.0 | 2.0 | 10 | 2.6 |
| 22 | 1 | 9 | 3.0 | 2.0 | 10 | 3.0 |
| 23 | 1 | 12 | 3.0 | 2.0 | 10 | 4.0 |
| 24 | 1 | 13 | 3.0 | 2.0 | 10 | 5.0 |
| 25 | 1 | 14 | 3.0 | 2.0 | 10 | 5.5 |
| 26 | 1 | 11 | 3.0 | 2.0 | 12 | 3.5 |
| 27 | 1 | 6 | 3.5 | 3.0 | 15 | 2.0 |
| 28 | 1 | 7 | 3.5 | 3.0 | 15 | 2.6 |
| 29 | 1 | 9 | 3.5 | 3.0 | 15 | 3.0 |
| 30 | 1 | 13 | 3.5 | 3.0 | 15 | 5.0 |
| 31 | 1 | 15 | 3.5 | 3.0 | 15 | 6.0 |
| 32 | 1 | 12 | 3.5 | 3.5 | 18 | 4.0 |
| 33 | 1 | 8 | 4.0 | 4.5 | 20 | 2.6 |
| 34 | 1 | 10 | 4.0 | 4.5 | 20 | 3.0 |
| 35 | 1 | 15 | 4.0 | 4.5 | 20 | 6.0 |
| 36 | 1 | 15 | 4.0 | 8.0 | 20 | 6.0 |
| 37 | 1 | 16 | 4.0 | 4.5 | 20 | 6.5 |
| 38 | 1 | 11 | 4.0 | 4.5 | 21 | 3.5 |
| 39 | 1 | 14 | 4.0 | 4.5 | 21 | 5.5 |

TABLE 5

| Sample No. | Tube No. | Fin No. | Coating for brazing (g/m²) Si powder | Binder | Zn flux | Zn content in Fin (mass %) |
|---|---|---|---|---|---|---|
| 40 | 1 | 17 | 3.0 | 1.5 | 7.5 | 2.6 |
| 41 | 1 | 18 | 3.0 | 1.5 | 7.5 | 2.6 |
| 42 | 1 | 19 | 3.0 | 1.5 | 7.5 | 2.6 |
| 43 | 1 | 20 | 3.0 | 1.5 | 7.5 | 2.6 |
| 44 | 1 | 21 | 3.0 | 1.5 | 7.5 | 2.6 |
| 45 | 1 | 22 | 3.0 | 1.5 | 7.5 | 2.6 |
| 46 | 1 | 23 | 3.0 | 1.5 | 7.5 | 2.6 |
| 47 | 1 | 24 | 3.0 | 1.5 | 7.5 | 2.6 |
| 48 | 1 | 25 | 3.0 | 1.5 | 7.5 | 2.6 |
| 49 | 1 | 26 | 3.0 | 1.5 | 7.5 | 2.6 |
| 50 | 2 | 7 | 2.5 | 1.0 | 5 | 2.6 |
| 51 | 3 | 7 | 2.5 | 1.0 | 5 | 2.6 |
| 52 | 4 | 7 | 2.5 | 1.0 | 5 | 2.6 |
| 53 | 5 | 7 | 2.5 | 1.0 | 5 | 2.6 |
| 54 | 1 | 6 | 0.5 | 1.0 | 5 | 2.0 |
| 55 | 1 | 6 | 5.5 | 1.0 | 5 | 2.0 |
| 56 | 1 | 5 | 3.0 | Not used | 7.5 | 1.6 |
| 57 | 1 | 5 | 3.0 | 8.5 | 7.5 | 1.6 |

TABLE 6

| Sample No. | Electric potential of primary crystal portion of fillet (mV vs SCE) | Electric potential of Fin (mV vs SCE) | Corrosion depth of tube (μm) | Separation ratio of fin (%) |
|---|---|---|---|---|
| 1 | −810 | −840 | 135 | 50 |
| 2 | −810 | −900 | 125 | 20 |
| 3 | −820 | −760 | 85 | 90 |
| 4 | −820 | −820 | 80 | 60 |
| 5 | −820 | −830 | 80 | 55 |
| 6 | −820 | −840 | 80 | 50 |
| 7 | −820 | −850 | 75 | 45 |
| 8 | −820 | −860 | 75 | 20 |
| 9 | −820 | −900 | 75 | 20 |
| 10 | −820 | −930 | 70 | 10 |
| 11 | −830 | −845 | 70 | 55 |
| 12 | −830 | −850 | 65 | 45 |
| 13 | −830 | −885 | 65 | 30 |
| 14 | −830 | −915 | 65 | 15 |
| 15 | −845 | −845 | 70 | 60 |
| 16 | −845 | −860 | 65 | 40 |
| 17 | −845 | −900 | 65 | 30 |
| 18 | −845 | −920 | 65 | 20 |

TABLE 7

| Sample No. | Electric potential of primary crystal portion of fillet (mV vs SCE) | Electric potential of Fin (mV vs SCE) | Corrosion depth of tube (μm) | Separation ratio of fin (%) |
|---|---|---|---|---|
| 19 | −855 | −845 | 80 | 95 |
| 20 | −855 | −850 | 70 | 65 |
| 21 | −855 | −885 | 65 | 40 |
| 22 | −855 | −900 | 65 | 40 |
| 23 | −855 | −930 | 65 | 30 |
| 24 | −855 | −950 | 65 | 60 |
| 25 | −855 | −950 | 65 | 70 |
| 26 | −875 | −920 | 65 | 40 |
| 27 | −890 | −850 | 75 | 95 |
| 28 | −890 | −885 | 70 | 65 |
| 29 | −890 | −900 | 65 | 50 |
| 30 | −890 | −950 | 65 | 40 |
| 31 | −890 | −960 | 65 | 75 |
| 32 | −910 | −940 | 65 | 50 |
| 33 | −920 | −860 | 70 | 95 |
| 34 | −920 | −915 | 65 | 65 |
| 35 | −920 | −960 | 60 | 65 |
| 36 | −920 | −960 | 70 | 65 |
| 37 | −920 | −980 | 70 | 85 |
| 38 | −960 | −920 | 70 | 85 |
| 39 | −960 | −950 | 70 | 80 |

TABLE 8

| Sample No. | Electric potential of primary crystal portion of fillet (mV vs SCE) | Electric potential of Fin (mV vs SCE) | Corrosion depth of tube (μm) | Separation ratio of fin (%) | Remarks |
|---|---|---|---|---|---|
| 40 | −845 | −860 | 75 | 70 | Fin: Fe exceeds upper limit |
| 41 | −845 | −860 | 70 | 60 | Fin: upper limit of Fe |
| 42 | −845 | −860 | 70 | 60 | Fin: upper limit of Si |
| 43 | −845 | −860 | 70 | 60 | Fin: lower limit of Si |
| 44 | −845 | −830 | 75 | 70 | Fin: Si exceeds upper limit |
| 45 | −845 | −835 | 75 | 70 | Fin: Si is less than lower limit |
| 46 | −845 | −850 | 70 | 60 | Fin: upper limit of Mn |
| 47 | −845 | −865 | 70 | 60 | Fin: lower limit of Mn |
| 48 | −845 | −825 | 75 | 70 | Fin: Mn exceeds upper limit |
| 49 | −845 | −865 | 75 | 60 | Fin: Mn is less than lower limit Fin has insufficient strength |
| 50 | −830 | −885 | 110 | 40 | tube 2 |
| 51 | −830 | −885 | 60 | 30 | tube 3 |
| 52 | −830 | −885 | 60 | 30 | tube 4 |
| 53 | −830 | −885 | 55 | 30 | tube 5 |
| 54 | −830 | −850 | 75 | 95 | Si powder is less than lower limit |
| 55 | −830 | −850 | 95 | 70 | Si powder exceeds upper limit |
| 56 | −845 | −845 | 135 | 75 | binder is less than lower limit |
| 57 | −845 | −845 | 145 | 95 | binder exceeds upper limit |

Based on the constitutions of each samples shown in Tables 3, 4, 5 and the results shown in Tables 6, 7, 8, it was found that each of samples (No. 4 to 9, 11 to 18, 20 to 24, 26, 28 to 30, 32, and 34 to 36) in which the amount of Zn-containing flux of the coating for brazing and the Zn content in the fin were controlled on the range enclosed by the points A, B, C, D, E, and F shown in FIG. 5 in accordance with the regulation of the present invention, showed smaller maximum corrosion depth compared to the samples (No. 1 to 3) having the amount of Zn containing flux or Zn content of the fin outside the range enclosed by A, B, C, D, E, F of FIG. 5, and also showed smaller separation ratio of fin after 30 days of SWAAT test compared to the samples (No. 10, 19, 25, 27, 31, 33, 38, 39) outside the regulated range.

The sample No. 54 shown in Table 5 and Table 8 having insufficient amount of Si powder and the sample No. 55 shown in Table 5 and Table 8 having an excessive amount of a Si powder both showed a high separation ratio of fin.

The sample No. 56 shown in Table 5 and Table 8 not including binder and the sample No. 57 shown in Table 5 and Table 8 including excessive binder both showed deep corrosion depth of the tube and a high separation ratio of fin.

Based on the constitutions of each samples shown in Table 3, Table 4, Table 5, and on the results shown in Table 6, Table 7, and Table 8, it was discovered that the below described conditions had some influence on the conditions for regulating the amount of Zn-containing flux in the coating for brazing and the Zn content of Fin to be in the range enclosed by the points A, B, C, D, E, and F shown in FIG. 5.

Cu content of the tube 2 shown in Table 1 was 0.15% that exceeded the limit of 0.1%, and the sample No. 50 shown in Table 4 using the tube 2 showed relatively deep corrosion depth.

While fin of sample No. 25 shown in Table 2 had a larger Mn content than the range of the present invention, and the fin of sample No. 26 had a smaller Mn content, sample No. 48 and 49 of Table 5 and Table 8 using those fins showed high separation ratio of fins. While fin of sample No. 21 shown in Table 2 had a larger Si content than the range of the present invention, and the fin of sample No. 22 had smaller Si content, sample No. 44 and 45 of Table 5 and Table 8 using those fins showed high separation ratio of fins. The fin of sample No. 17 of Table 2 had a smaller Fe content than the range of the present invention, and the sample No. 40 of Table 5 and Table 8 using this fin showed a high separation ratio of fin. The fin of sample No. 16 of Table 2 had a smaller Zn content than the range of the present invention, and the sample No. 37 of Table 4 and Table 7 using this fin showed a high separation ratio of fin.

As explained above, based on the constitution of each samples shown in Table 3, Table 4, and Table 5 and the results shown in Table 6, Table 7 and Table 8, it was made clear that a heat exchanger that satisfied the conditions according to the present invention could provide a heat exchanger that had excellent corrosion resistance and separation of a fin did not easily occur after a corrosion resistance test.

INDUSTRIAL APPLICABILITY

According to the present invention, it is possible to provide a heat exchanger in which separation of a fin from the tube does not easily occur and that has excellent corrosion resistance.

The invention claimed is:

1. An aluminum alloy heat exchanger formed by assembling and brazing one or more aluminum alloy tubes and one or more aluminum alloy fins to each other,
    wherein a coating for brazing comprising from 1 to 5 g/m$^2$ of Si powder, from 3 to 20 g/m$^2$ of Zn containing flux, and from 0.2 to 8.3 g/m$^2$ of binder is formed on a surface of the aluminum alloy tube;
    wherein the aluminum alloy fin comprises aluminum and from 0.8 to 2.0% by mass of Mn, Si in a ratio of 1/2.5 to 1/3.5 relative to Mn, less than 0.30% by mass of Fe, and Zn in an amount that is controlled in relation with the amount of the Zn containing flux in the coating for brazing to be in a region enclosed by points A, B, C, D, E, and F of FIG. 5;
    wherein a fillet comprising brazing filler of the coating for brazing is formed between the tube and the aluminum alloy fin which are in physical contact after the brazing;
    wherein a primary crystal portion that joins the fin and the tube is formed in the fillet;
    wherein a eutectic crystal portion is formed in a portion other than the primary crystal portion; and
    an electric potential of the primary crystal portion is set equal to or higher than an electric potential of the aluminum alloy fin.

2. The aluminum alloy heat exchanger according to claim 1, wherein the aluminum alloy tube comprises Al and less than 0.1% by mass of Cu, from 0.1 to 0.6% by mass of Si, from 0.1 to 0.6% by mass of Fe, and from 0.1 to 0.6% by mass of Mn.

3. The aluminum alloy heat exchanger according to claim 2, wherein the aluminum alloy tube further comprises from 0.005 to 0.2% by mass of Ti and/or from 0.05 to 0.2% by mass of Cr.

4. The aluminum alloy heat exchanger according to any one of claims 1 to 3, wherein the aluminum alloy fin further comprises one or more selected from 0.05 to 0.2% by mass of Zr, from 0.01 to 0.2% by mass of V, from 0.05 to 0.2% by mass of Ti, and from 0.01 to 0.2% by mass of Cr.

* * * * *